United States Patent
N. et al.

(10) Patent No.: US 9,954,758 B2
(45) Date of Patent: Apr. 24, 2018

(54) VIRTUAL NETWORK FUNCTION RESOURCE ALLOCATION AND MANAGEMENT SYSTEM

(71) Applicant: Dell Products L.P., Round Rock, TX (US)

(72) Inventors: Safina Devi N., Tamil Nadu (IN); Balaji Venkat Venkataswami, TamilNadu (IN); Wenjing Chu, Saratoga, CA (US)

(73) Assignee: Dell Products L.P., Round Rock, TX (US)

( * ) Notice: Subject to any disclaimer, the term of this patent is extended or adjusted under 35 U.S.C. 154(b) by 241 days.

(21) Appl. No.: 15/046,219

(22) Filed: Feb. 17, 2016

(65) Prior Publication Data

US 2017/0237647 A1   Aug. 17, 2017

(51) Int. Cl.
G06F 15/173 (2006.01)
H04L 12/26 (2006.01)
G06F 9/455 (2018.01)

(52) U.S. Cl.
CPC .............. H04L 43/16 (2013.01); G06F 9/455 (2013.01)

(58) Field of Classification Search
USPC .................. 709/223, 224, 226; 370/229, 254
See application file for complete search history.

(56) References Cited

U.S. PATENT DOCUMENTS

2012/0257496 A1* 10/2012 Lattmann ................ H04L 45/00
370/229
2013/0136032 A1* 5/2013 Meirosu .................. H04W 8/02
370/254
2014/0317293 A1* 10/2014 Shatzkamer ........... G06F 9/455
709/226
2015/0334045 A1* 11/2015 Tremblay .............. H04L 47/783
709/226
2016/0119189 A1* 4/2016 Choi ....................... H04L 41/12
709/223

(Continued)

OTHER PUBLICATIONS

Daniel S. Dias and Luís Henrique M. K. Costa, "Online Traffic-Aware Virtual Machine Placement in Data Center Networks," Global Information Infrastructure and Networking Symposium (GIIS), Dec. 2012, pp. 1-8, GIIS'12 1569677169, IEEE.

(Continued)

*Primary Examiner* — Tammy Nguyen
(74) *Attorney, Agent, or Firm* — Haynes and Boone, LLP

(57) ABSTRACT

A virtualized network function (VNF) provisioning system includes a plurality of computing device that are provided in a physical topology and that are coupled to a network. A management device is coupled to the computing device through the network. The management device receives VNF system information for a VNF system through the network. The VNF system includes a plurality of VNFs that are provided in a virtual topology. The management device then determines a plurality of physical groups from the physical topology that each identify at least one computing device. The management device then determines a plurality of virtual groups from the virtual topology based on a ratio of traffic that will leave each virtual group and a number of VNFs in each virtual group. The management device then provides the VNFs in a first virtual group on the at least one computing device in a first physical group.

20 Claims, 13 Drawing Sheets

(56) References Cited

U.S. PATENT DOCUMENTS

2016/0352924 A1* 12/2016 Senarath ............ H04M 15/8016
2016/0353268 A1* 12/2016 Senarath ................. H04W 4/24
2017/0026235 A1*  1/2017 Famaey .............. H04L 12/4641
2017/0237647 A1*  8/2017 N ............................ H04L 43/16
                                                           709/224

OTHER PUBLICATIONS

Moses Charikar, "Greedy Approximation Algorithms for Finding Dense Components in a Graph, In Approximation Algorithms for Combinatorial Optimization," 2000,13 Pages, vol. 1913, LNCS, 84-95, DOI: 10.1007/3-540-44436-X\_10, URL: http://dx.doi.org/10.1007/3-540-44436-X\_10.

* cited by examiner

VIRTUAL NETWORK FUNCTION RESOURCE ALLOCATION AND MANAGEMENT SYSTEM

BACKGROUND

The present disclosure relates generally to information handling systems, and more particularly to the resource allocation and management of virtual network functions in an information handling system network.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Network Function Virtualization (NFV) is a network architecture concept that utilizes virtualization to provide entire classes of network node functions on information handling systems such as servers, switches, storage systems, cloud infrastructure, and/or other computing devices in order to enable network communications. A Virtualized Network Function (VNF) provided via NFV may include one or more virtual machines running on computing systems to enable networking functions, rather than using dedicated hardware networking appliances. Conventionally, VNF systems are provided on such computing systems using cluster placement techniques. Cluster placement techniques typically operate by grouping the physical topology of the computing systems in the network into hardware clusters, grouping the virtual topology that includes VNFs in the VNF system into software clusters, and providing each software cluster of VNFs on at least one of the hardware clusters of the computing systems. The provision of VNF systems in such a manner raises a number of issues.

For example, the grouping of VNFs in the VNF system into software clusters is typically performed by designating each group of connected VNFs as a software cluster, and then determining whether that software cluster can be provided on a respective hardware cluster in the computing system (e.g., a server or group of servers). If that software cluster cannot be provided on a respective hardware cluster in the computing system, that "primary" software cluster is broken up into a smaller "secondary" software clusters by removing the lowest bandwidth "edge VNFs" that transmit the lowest amount of traffic in the primary software cluster. The secondary software clusters are then provided in the hardware clusters using bin packing algorithms while ensuring capacity constraints are not exceeded, which works to maximize the traffic within VNF systems and minimize the traffic leaving VNF systems. Such clustering techniques typically reduce the communication distance between VNFs in the VNF systems while reducing the number of computing devices needed to provide the VNF systems. However, such clustering techniques can remove too many edge VNFs from a VNF system when, for example, there are multiple edge VNFs that transmit the same amount of traffic out of their primary software cluster. Furthermore, the selection of the lowest bandwidth VNFs for removal often results in non-optimal software clusters that separate VNFs that subsequently will need to communicate across the network fabric with VNFs from which they were separated.

Accordingly, it would be desirable to provide an improved VNF resource allocation and management system.

SUMMARY

According to one embodiment, an information handling system (IHS) includes a communication system and that is configured to couple to a plurality of computing systems; a processing system that is coupled to the communication system; and a memory system that is coupled to the processing system and that includes instructions that, when executed by the processing system, cause the processing system to provide a virtualized network function (VNF) allocation engine that is configured to: receive virtualized network function (VNF) system information for a VNF system, wherein the VNF system includes a plurality of VNFs that are provided in a virtual topology; determine a plurality of physical groups from a physical topology of the plurality of computing devices, wherein each physical group identifies at least one computing device of the plurality of computing devices; determine a plurality of virtual groups from the virtual topology based on a ratio of traffic that will leave each virtual group and a number of VNFs in each virtual group; and provide the VNFs in a first virtual group of the plurality of virtual groups on the at least one computing device in a first physical group of the plurality of physical groups.

DETAILED DESCRIPTION

For purposes of this disclosure, an information handling system may include any instrumentality or aggregate of instrumentalities operable to compute, calculate, determine, classify, process, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
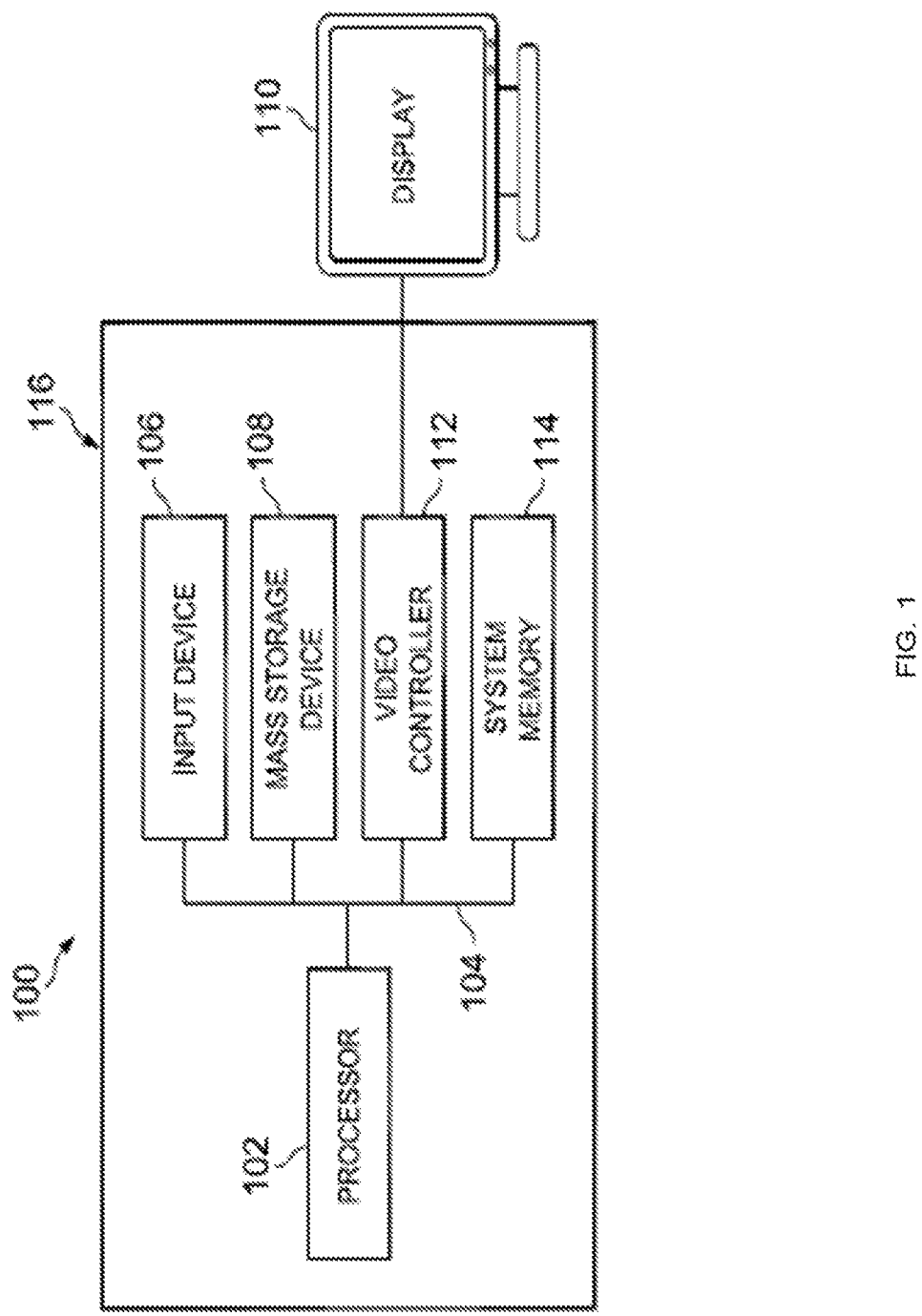
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
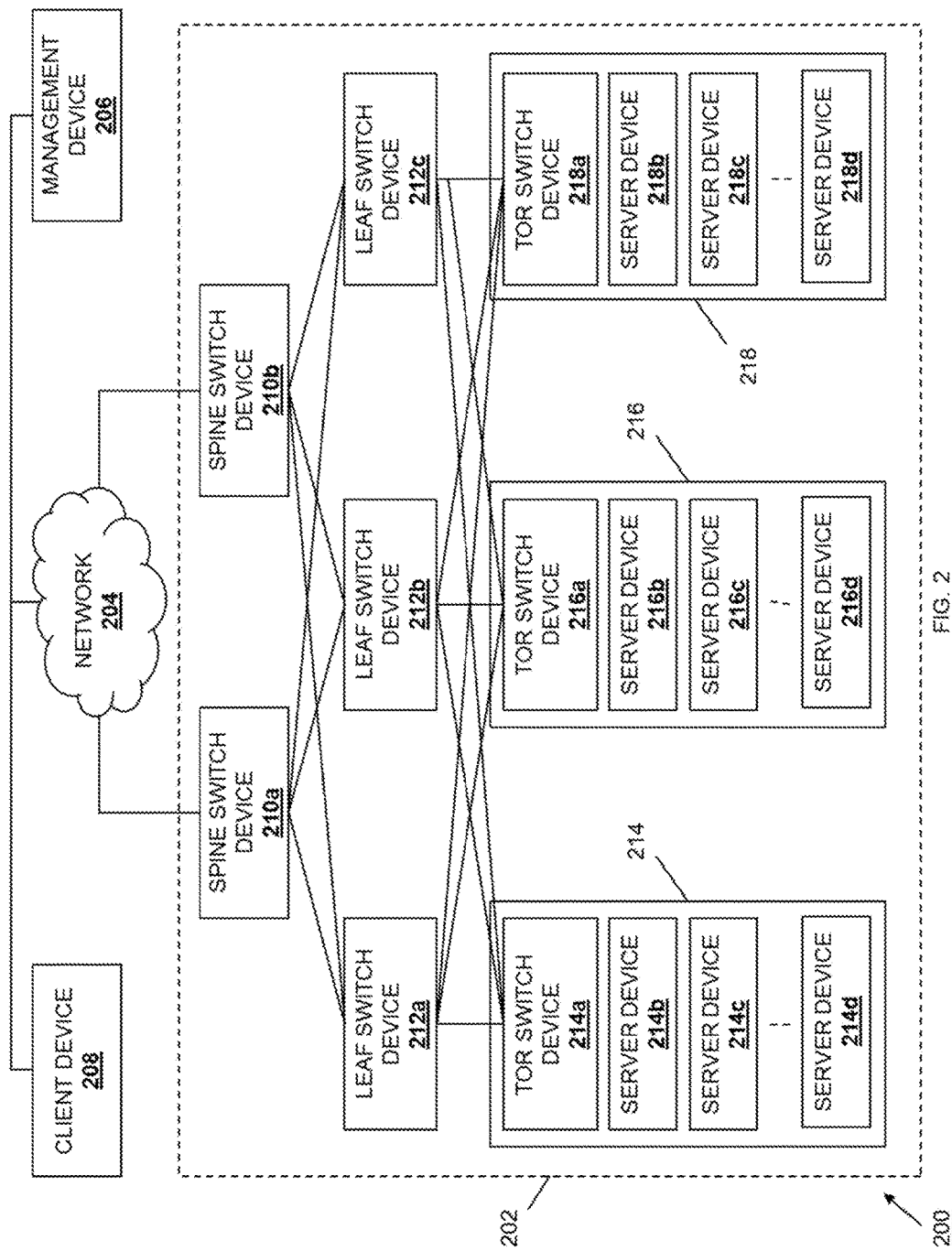
FIG. 2 is a schematic view illustrating an embodiment of a datacenter.

Referring now to FIG. 2, an embodiment of a Virtual Network Function (VNF) provisioning system 200 is illustrated. In the illustrated embodiment, the VNF provisioning system 200 includes a datacenter 202 that is coupled to a network 204 such as a Local Area Network (LAN), the Internet, and/or any other network or network combinations known in the art. A management device 206 and a client device 208 are also each coupled to the network 204. In an embodiment, the management device 206 and/or the client device 208 may be the IHS 100 discussed above with reference to FIG. 1 and/or may include some or all of the components of the IHS 100. In specific embodiments, the management device 206 and/or the client device 208 may include desktop computing devices, laptop/notebook computing devices, tablet computing devices, mobile phones, and/or other computing devices known in the art. While the management device 206 is illustrated as located outside the datacenter 202, the management device may be provided in the datacenter 202 while remaining within the scope of the present disclosure. While only a single datacenter 202 is illustrated as being provided in the VNF provisioning system 200 illustrated in FIG. 2, as discussed below, other datacenters that are similar to the datacenter 202 may be included in the VNF provisioning system 200 while remaining within the scope of the present disclosure.

In the embodiment, illustrated in FIG. 2, the datacenter 202 includes a plurality of spine switch devices 210a and 210b that are each coupled to the network 204. In an embodiment, the spine switch devices 210a and 210b may be the IHS 100 discussed above with reference to FIG. 1 and/or may include some or all of the components of the IHS 100. The datacenter 202 also includes a plurality of leaf switch devices 212a, 212b, and 212c that are coupled to each of the spine switch devices 210a and 210b. In an embodiment, the leaf switch devices 212a, 212b, and 212c may be the IHS 100 discussed above with reference to FIG. 1 and/or may include some or all of the components of the IHS 100. The datacenter 202 also includes a plurality of Top Of Rack (TOR) switch devices 214a, 216a, and 216b that are coupled to each of the leaf switch devices 212a, 212b, and 212c. In an embodiment, the TOR switch devices 214a, 216a, and 216b may be the IHS 100 discussed above with reference to FIG. 1 and/or may include some or all of the components of the IHS 100. The TOR switch device 214a is located in a rack 214 with a plurality of computing devices that are illustrated as server devices 214b, 214c, and up to 214d, the TOR switch device 216a is located in a rack 216 with a plurality of computing devices that are illustrated as server devices 216b, 216c, and up to 216d, and the TOR switch device 218a is located in a rack 218 with a plurality of computing devices that are illustrated as server devices 218b, 218c, and up to 218d. While a specific example of a VNF provisioning system 200 has been illustrated, one of skill in the art in possession of the present disclosure will recognize that a wide variety of modification may be made to the VNF systems (e.g., addition or removal of devices, addition or removal of racks, addition or removal of datacenters, etc.) while remaining within the scope of the present disclosure.

Figure 3:
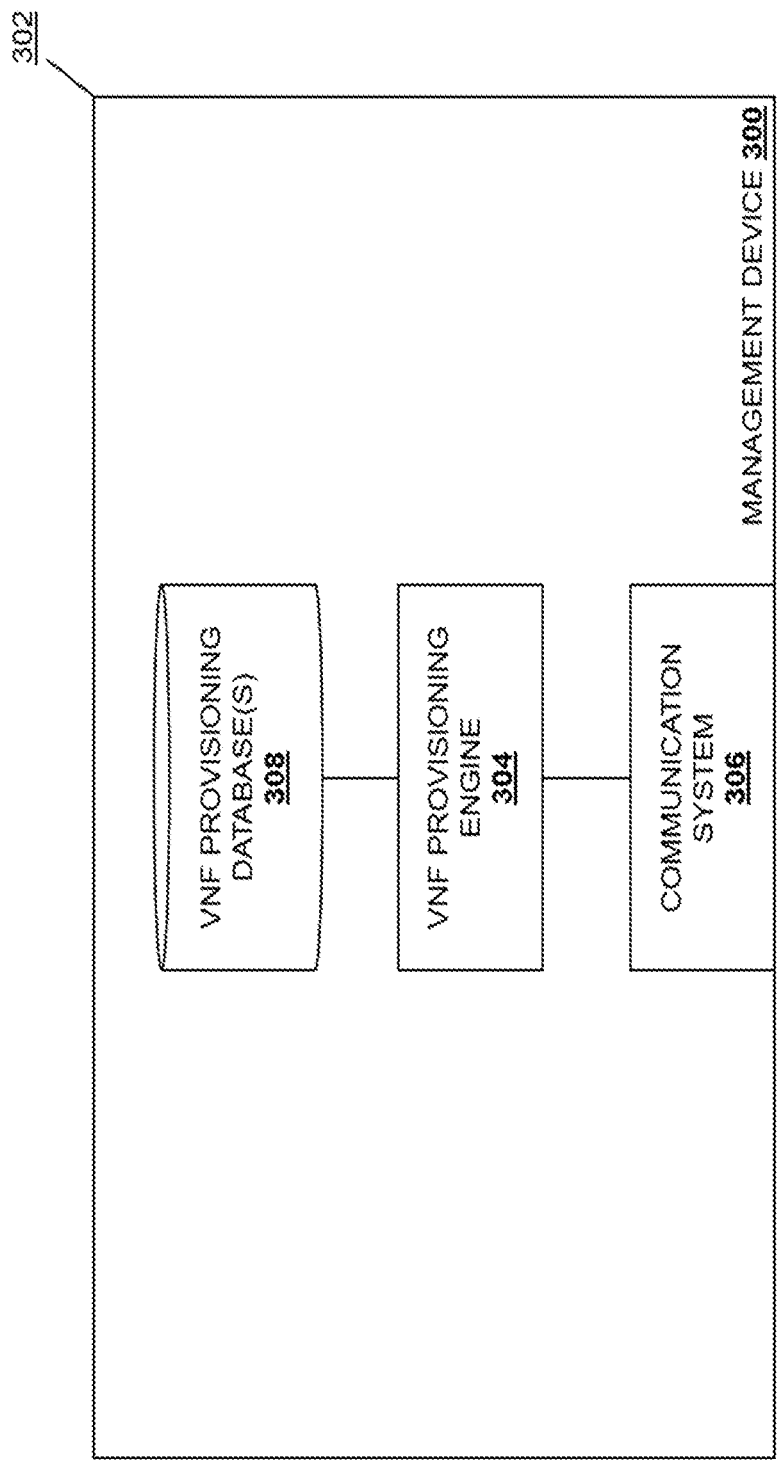
FIG. 3 is a schematic view illustrating an embodiment of a management system used in the datacenter of FIG. 2.

Referring now to FIG. 3, an embodiment of a management device 300 is illustrated that may be the management device 206 discussed above with reference to FIG. 2. As such, the management device 300 may be the IHS 100 discussed above with reference to FIG. 1 and/or may include some or all of the components of the IHS 100, and in specific embodiments may include a desktop computing device, a laptop/notebook computing device, a tablet computing device, a mobile phone, and/or other computing devices known in the art. The management device 300 includes a chassis 302 that houses some or all of the components of the management device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a VNF provisioning engine 304 that is configured to perform the functions of the VNF provisioning engines and management devices discussed below. The chassis 302 also houses a communication system 306 that is coupled to the VNF provisioning engine 304 (e.g., via a coupling between the processing system and the communication system 306) and that may be provided by a Network Interface Controller (NIC), a wireless communication device, and/or other communication systems known in the art. The chassis 302 may also house a storage system (not illustrated, but which may include the storage device 108 discussed above with reference to FIG. 1) that includes one or more VNF provisioning database 308 that store any of the information that is utilized to provision the VNFs as discussed below. While a specific management device 300 has been described, one of skill in the art in possession of the present disclosure will recognize that the management device 300 may include a variety of other components for performing other management functionality while remaining within the scope of the present disclosure.

Figure 4:
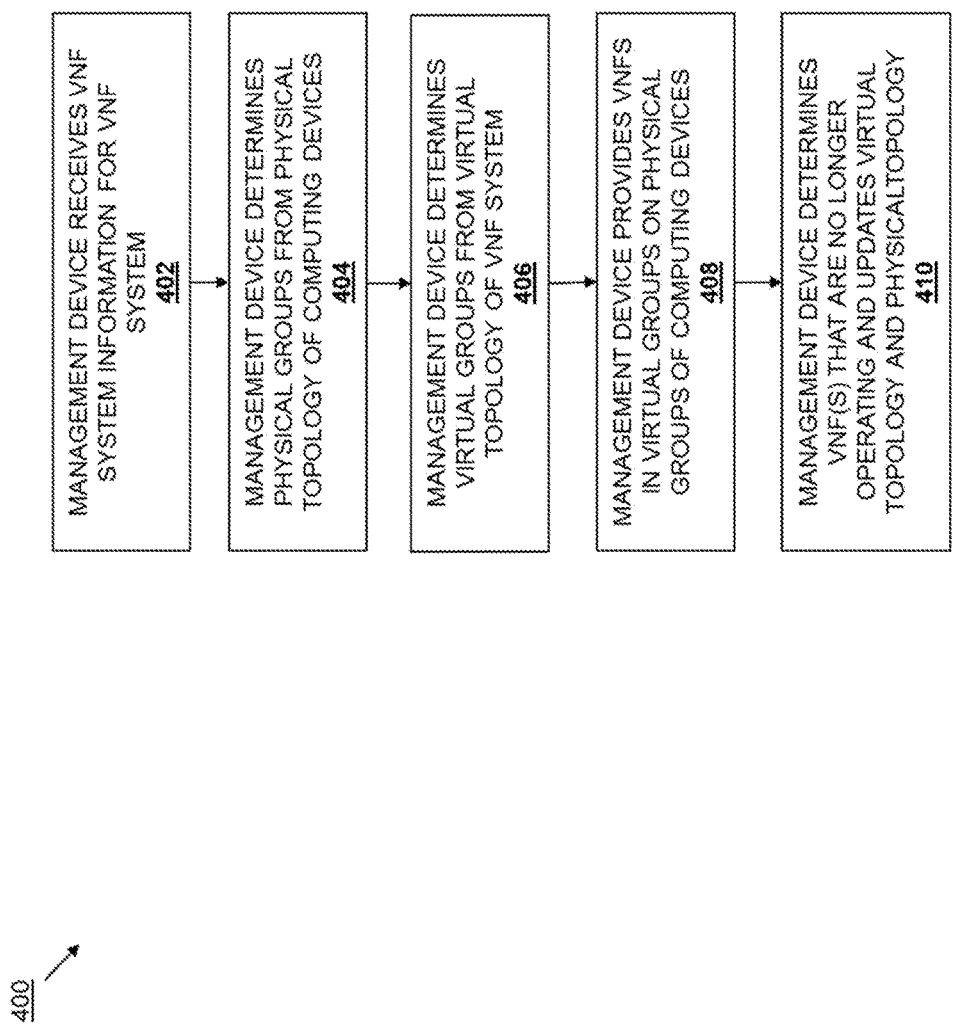
FIG. 4 is a flow chart illustrating an embodiment of a method for providing virtualized network functions.

Referring now to FIG. 4, an embodiment of a method 400 for provisioning VNFs is illustrated. As discussed below, the systems and methods of the present disclosure may provision VNF systems using a determination of the "densest" virtual groups of VNFs in a virtual topology that includes the VNF system, which may be based on a ratio of the traffic that will leave each virtual group and a number of VNFs in that virtual group. In some embodiments, a virtual topology that includes a VNF system may be modified to provide a merged virtual topology by merging VNFs that perform similar functions, and the densest virtual groups may be selected from that merged virtual topology. Those virtual groups of VNFs may then be provided in physical groupings of a physical topology of a plurality of computing devices, with datacenters that prioritize bandwidth conservation, communication latency reduction, and power efficiency including a preference to providing the densest virtual groups in a physical group that includes a single computing device, or a physical group that includes a plurality of computing devices in a common rack, as such preferences have been found to conserve network bandwidth utilized by VNFs, reduce the latency between VNF systems, and minimize the number of computing devices utilized to provide the VNF systems to reduce the power consumption by the computing devices.

The method 400 begins at block 402 where a management device receives VNF system information for a VNF system. In an embodiment, the VNF provisioning engine 304 in the management device 206/300 may receive a virtualized service request that includes VNF system information for a VNF system in response to a communication through the network 204 with the client device 208. For example, the client device 208 may request a virtualized service that may be provided through the datacenter 202 and, in response, VNF system information for providing a VNF system that will enable that virtualized service may be determined by the VNF provisioning engine 304 and/or provided to the VNF provisioning engine 304. For example, the virtualized service may require virtual machines (VMs) that are to be configured to provide web servers VMs and/or other endpoint VMs, as well as a VNF system that includes VNFs that provide the intermediary network functions for those endpoint VMs including firewall VNFs, network address translation VNFs, content caching VNFs, packet inspection VNFs, and/or a variety of other VNFs known in the art, that will operate in cooperation with the endpoint VMs to enable the virtualized service requested by the client device. As such, a virtualized service may include "endpoint" web server VMs that communicate with each other via "intermediary" VNFs such as a firewall VNF and a network address translation VNF (also provided by VMs), although one of skill in the art will recognize that other VNF system configurations will fall within the scope of the present disclosure.

As would be understood by one of skill in the art in possession of the present disclosure, the VNF system described by the VNF system information received at block 402 may a provided in the datacenter 202 and/or similar datacenters connected to the network 204, and there are a variety of ways in which the VNFs in the VNF system may be provisioned in the datacenter 202. For example, all of the VNFs in the VNF system may be provided in a single server device, in a single rack (e.g., communicating via connections to a single TOR switch device), in service devices in different racks (e.g., communicating via connections to different TOR switch devices), and/or in in server devices in different data centers. When providing the VNFs of the VNF system in the datacenter(s), it may be desirable to provide the VNFs as "close together" as possible (e.g., in the same server device, in server devices in the same rack, etc.) in order to avoid unnecessary consumption of bandwidth and lower communication latency, while also considering the processing, memory, and networking hardware bandwidth constraints of the server devices in which the VNFs will be provided. For example, the "distance" between any two VNFs may be measured by the distance between them in a physical topology of the server devices in the datacenter 202, and that distance may be minimized in datacenters that prioritize bandwidth and power conservation and latency reduction. However, as discussed below, other datacenters may prioritize other datacenter characteristic (e.g., failure resiliency) and thus the provisioning of VNFs in datacenter(s) may change based on those priorities. The embodiments of the systems and methods discussed immediately below aim to minimize the distance between VNFs included in a VNF system to provide the benefits discussed above, while also minimizing the number of server devices used to provide the VNF system (which can operate to decrease the energy consumption of the datacenter 202).

In a specific example, the provisioning of the VNFs in a VNF system may be performed, at least in part, by considering the minimization of the function m:

$$m = \gamma\alpha + \ominus\beta$$

Where $\alpha$ is the number of server devices used, $\beta$ is the sum total of the sizes of all of the VNF systems in the server devices, and $\gamma$ and $\ominus$ are normalization factors. In an embodiment, $\ominus$ may be obtained by considering the conditions of the datacenter such as, for example, providing a smaller γ and a larger ⊖ for a datacenter having bandwidth constraints, and providing a smaller ⊖ and a larger γ for a datacenter with higher energy costs and more traffic bottlenecks.

In an embodiment, a mathematical model for minimizing the function m may include the following:

Input: physical topology (sometimes referred to as a "physical graph"): G=(V, E)
   Virtual topology (sometimes referred to as a "virtual graph"): H=(V', E')
   Weight functions w: E→Q$^+$, w': E'→Q$^+$
   Storage, compute, and energy constraints for each vertex in V
   Network bandwidth constraints for each pair in V×V
Solution: An allocation function f: V'→V
Measure: m=γα+⊖β
   β$\Sigma_{(u,v)\in E'}$,d(f(u),(f(v)).load((u.v))
   α=|Range(f)|,
   γ≥0
   ⊖≥0

In the mathematical model above, V is the set of server devices in the datacenter(s) and E is a measure of the connections between them. V' is the set of VNFs in the virtual topology and E' is a measure of the connections between them. w is a measure of the hop count or distance between end vertices of the corresponding edge in the physical topology, and w' is a measure of the network bandwidth demand on the corresponding edge. The allocation function f is the allocation of the VNFs, and x, y∈V, d(x,y) gives the distance between x and y. β is a measure of the sum total traffic load of all the VNF systems in the datacenter(s), and α gives the number of server devices used to provide the VNF systems. load(((u,v)) is a measure of the bandwidth demand on the edge (u, v), and γ, ⊖ are normalizing factors.

Figure 5:
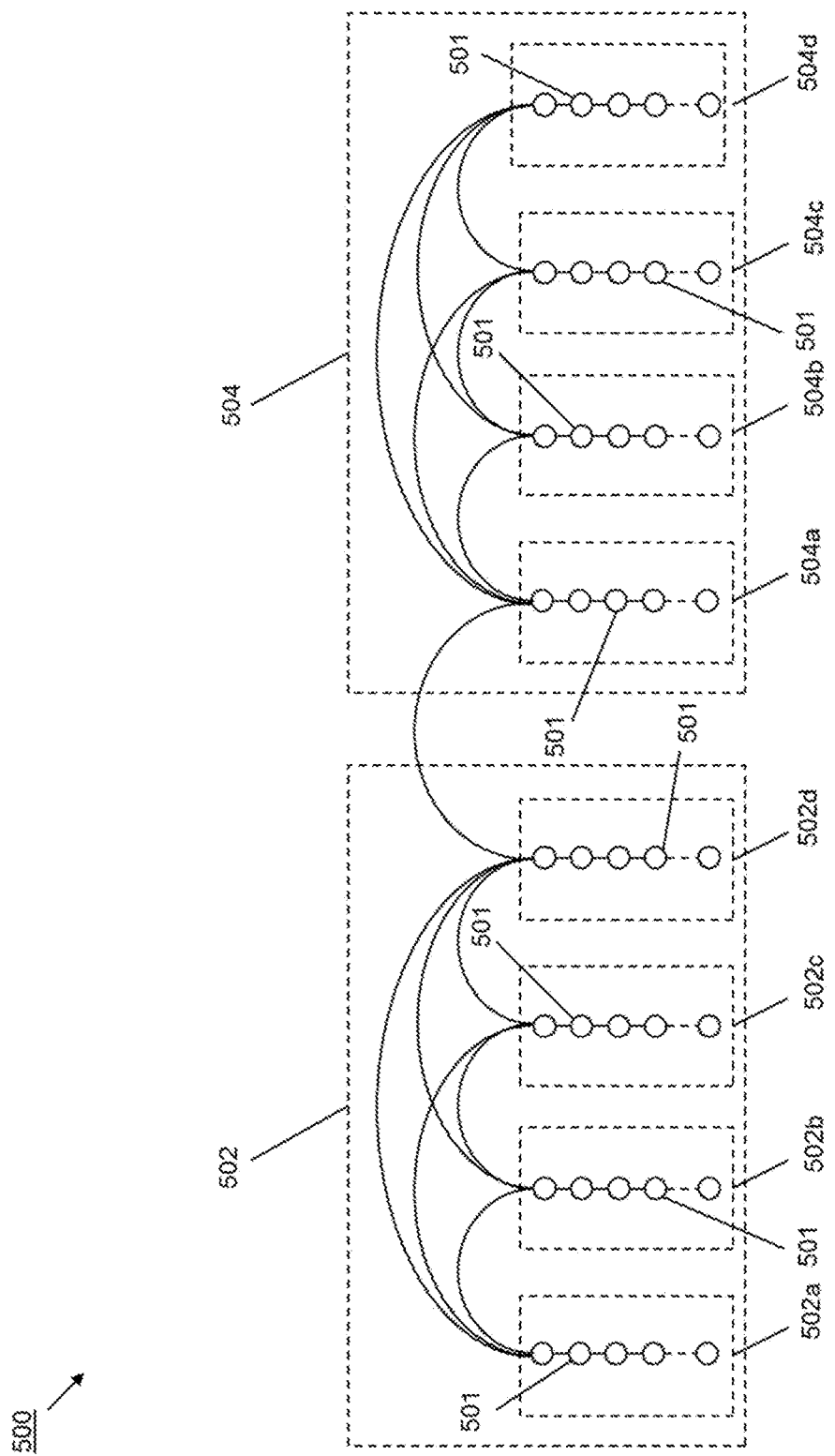
FIG. 5 is a schematic view illustrating an embodiment of a physical topology of computing devices provided in a plurality of datacenters.

The method 400 then proceeds to block 404 where the management device determines physical groups from a physical topology of computing devices. FIG. 5 illustrates a physical topology 500 of computing devices in a plurality of datacenters. For example, a plurality of nodes 501 are included in the physical topology 500, with each node representing a server device (e.g., the server devices in the datacenter 202 of FIG. 2), and groups of the nodes 501 represent server devices in the racks 502a, 502b, 502c, and 502d of a datacenter 502, and server devices in the racks 504a, 504b, 504c, and 504d of a datacenter 504, each of which may be the datacenter 202 discussed above. In some embodiments, a physical group determined from the physical topology 500 may be a single node corresponding to a single server device in a datacenter, or a plurality of nodes corresponding to respective server devices in the same rack. The determination of the physical groups from the physical topology 500 is based on a "density" of nodes in the physical topology that is determined based on a ratio of the amount of traffic that will be sent in and out of that physical group (e.g., by node(s) at the edges of that physical group that will sending/receiving traffic with other physical group(s) in the physical topology), and the number of nodes in that physical group. Using such a density based determination, the densest physical groups determined from the physical topology 500 may be the plurality of nodes that correspond to a plurality of server devices in each rack 502a-d and 504a-d of the datacenters 502 and 504. For example, in a Clos network datacenter, physical groups determined from a physical topology of servers in that datacenter based on the densities described above will typically include the server devices in each rack of that datacenter.

Figure 6:
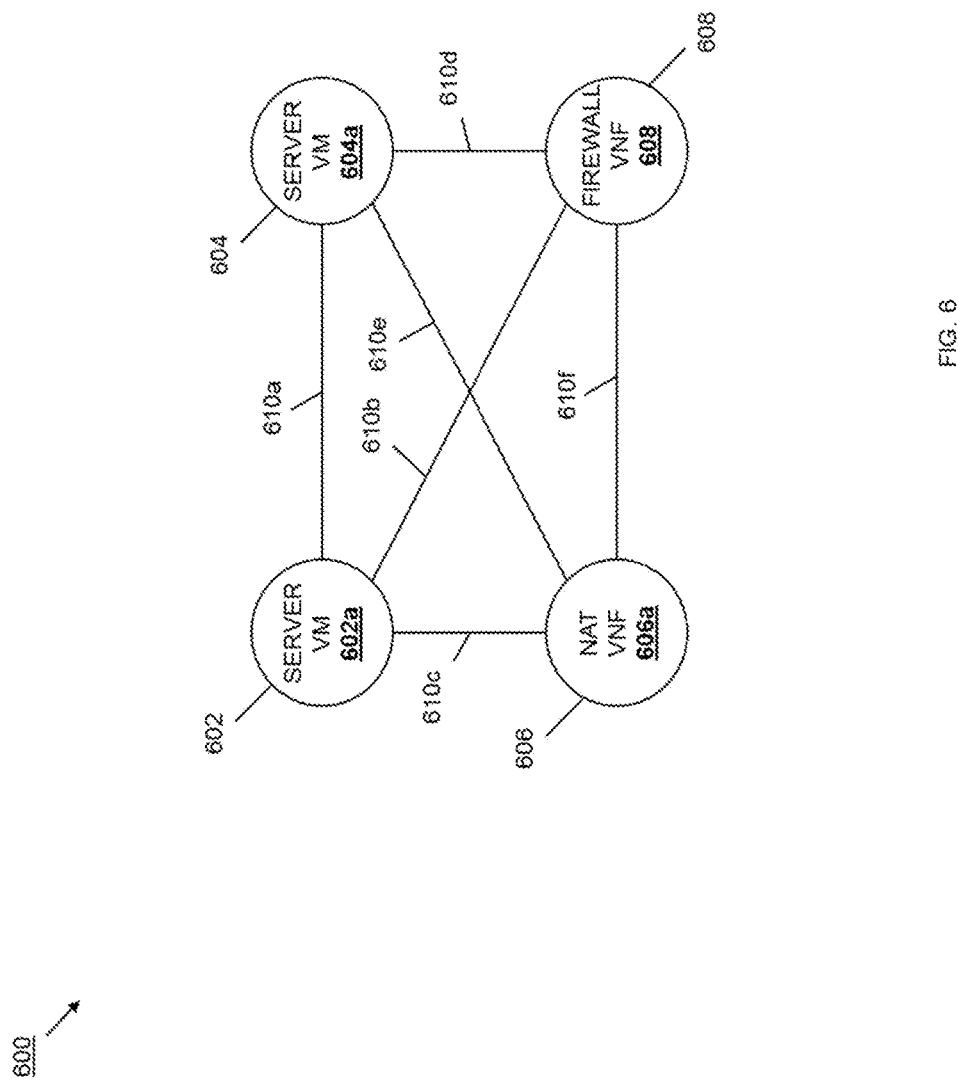
FIG. 6 is a schematic view illustrating an embodiment of a virtual topology that includes a virtualized network function system.

The method 400 then proceeds to block 406 where the management device determines virtual groups from a virtual topology that includes a VNF system. FIG. 6 illustrates a virtual topology 600 that a VNF system. For example, a plurality of nodes 602, 604, 606, and 608 are included in the virtual topology 600, with the node 602 representing a web server or other endpoint VM 602a, the node 604 representing a web server or other endpoint VM 604a, the node 606 representing a network address translation VNF 606a, and the node 608 representing a firewall VNF 608a. As can be seen in FIG. 6, the node 602 may transmit traffic with the node 604 via link(s) 610a, with the node 608 via link(s) 610b, and the node 606 via link(s) 610c; the node 604 may transmit traffic with the node 608 via link(s) 610d, with the node 606 via link(s) 610e, and the node 602 via link(s) 610a; the node 608 may transmit traffic with the node 604 via link(s) 610d, with the node 602 via link(s) 610b, and the node 606 via link(s) 610f; and the node 606 may transmit traffic with the node 608 via link(s) 610f, with the node 604 via link(s) 610e, and the node 602 via link(s) 610c.

Figure 7:
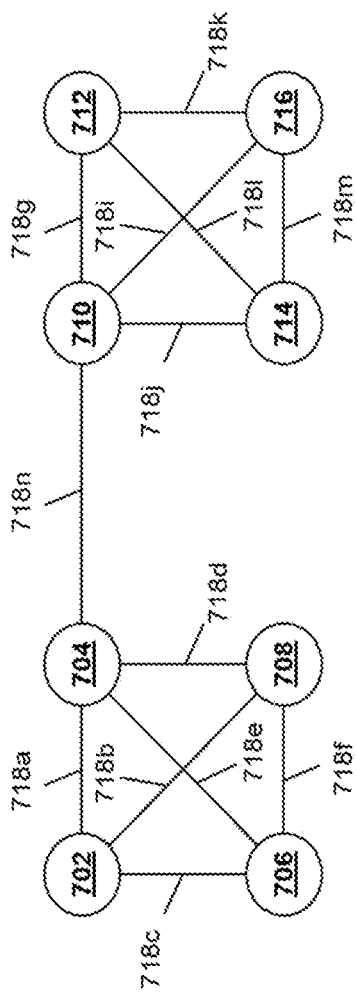
FIG. 7 is a schematic view illustrating an embodiment of a virtual topology that includes a virtualized network function system.

The virtual topology 600 provides a very simplified example of a virtual topology, and one of skill in the art will recognize that many more nodes will typically be included in a virtual topology that provides a virtualized system. For example, FIG. 7 illustrates a virtual topology 700 having nodes 702, 704, 706, 708, 710, 712, 714, 716, and 718 representing endpoint VMs and the VNFs that provide a VNF system. As can be seen in FIG. 7, the node 702 may transmit traffic with the node 704 via link(s) 718a, with the node 708 via link(s) 718b, and the node 706 via link(s) 718c; the node 704 may transmit traffic with the node 708 via link(s) 718d, with the node 706 via link(s) 718e, and the node 702 via link(s) 718a; the node 708 may transmit traffic with the node 704 via link(s) 718d, with the node 702 via link(s) 718b, and the node 706 via link(s) 718f; and the node 706 may transmit traffic with the node 708 via link(s) 718f, with the node 704 via link(s) 718e, and the node 702 via link(s) 718c. As can also be seen in FIG. 7, the node 710 may transmit traffic with the node 712 via link(s) 718g, with the node 716 via link(s) 718i, and the node 714 via link(s) 718j; the node 712 may transmit traffic with the node 716 via link(s) 718k, with the node 714 via link(s) 718l, and the node 710 via link(s) 718g; the node 716 may transmit traffic with the node 712 via link(s) 718k, with the node 710 via link(s) 718i, and the node 714 via link(s) 718m; and the node 714 may transmit traffic with the node 716 via link(s) 718m, with the node 712 via link(s) 718l, and the node 710 via link(s) 718j. In addition, the nodes 704 and 710 may transmit traffic via link(s) 718n.

Figure 8:
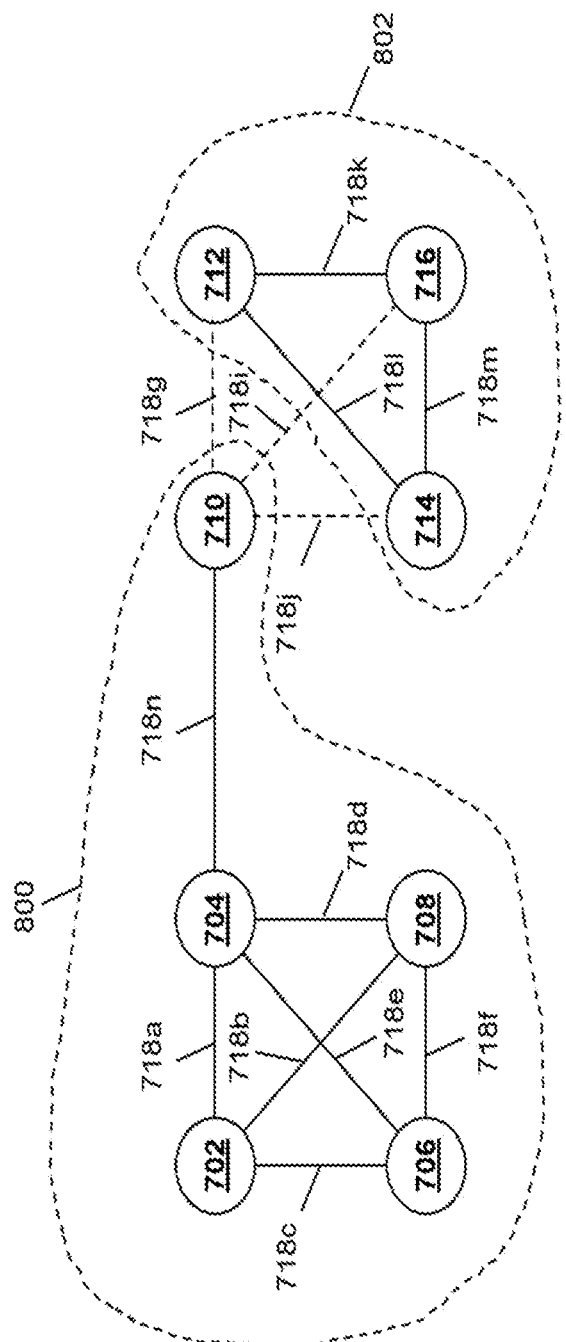
FIG. 8 is a schematic view illustrating an embodiment of the virtual topology that includes the virtualized network function system of FIG. 7 that has been grouped into virtual groups according to conventional techniques.

In the event that the virtual topology 700 cannot be provided in its entirety on a single physical group determined from the physical topology of the server devices as discussed above, the virtual topology may be broken up into virtual groups of endpoint VMs and/or VNFs. As discussed above, conventional VNF provision systems would break the virtual topology 700 up into software clusters by breaking the lowest bandwidth links between nodes in the virtual topology 700, and then use bin packing algorithms to place each of the software clusters into the physical groups of server devices, attempting to maximize the traffic bandwidth within the software clusters and minimize the traffic bandwidth leaving the software clusters. FIG. 8 illustrates the virtual topology 700 of FIG. 7 broken into software clusters 800 and 802 using such conventional techniques. For example, FIG. 8 illustrates a situation where each of the link(s) 718g, 718i, and 718j were determined to have the lowest bandwidth of the links provided in the virtual topology 700. For example, each of the links 718g, 718i, and 718j may transfer the same amount of traffic, the conventional methods of removing the lowest bandwidth links resulted in the removal of those links to provide the software clusters 800 and 802. FIG. 8 illustrates (e.g., by comparison to FIG. 9 discussed below) how conventional methods of determining software clusters from a virtual topology may result in the removal of multiple links when the removal of fewer links would result in multiple software clusters, which can result in more inter-software cluster traffic. In the event that the virtual topology 700 was broken into the software clusters 800 and 802 due to racks in the datacenter being able to accommodate a maximum of 5 nodes, the provisioning of the VNFs in the software clusters 800 and 802 on different racks would result in inter-rack traffic over the links 718g, 718i, and 718j that would now extend between racks.

Figure 9:
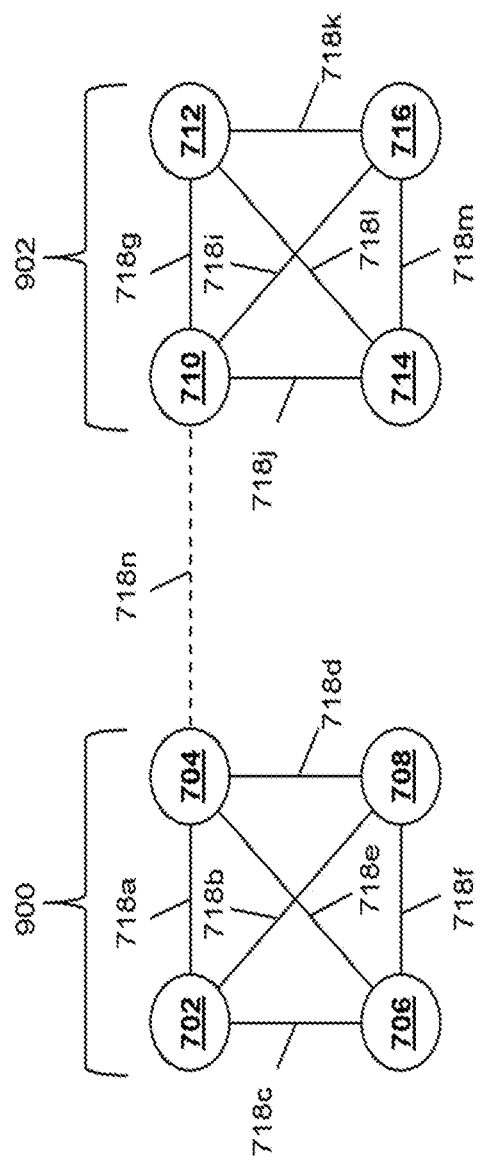
FIG. 9 is a schematic view illustrating an embodiment of the virtual topology that includes the virtualized network function system of FIG. 7 that has been grouped into virtual groups according to the teachings of the present disclosure.

However, in an embodiment of block 406, the VNF provisioning engine 304 in the management device 206/300 may determine virtual groups from the virtual topology based on a "density" of virtual groups in the virtual topology. For example, the density of a virtual group in a virtual topology may be determined based on a ratio of the amount of traffic that may be sent in and out of that virtual group (e.g., by node(s) at the edges of that virtual group that will sending/receiving traffic with other virtual group(s)), and the number of nodes in that virtual group. FIG. 9 illustrates the virtual topology 700 of FIG. 7 broken into virtual groups 900 and 902 using such virtual group density techniques. For example, FIG. 9 illustrates a situation where each of the virtual groups 900 and 902 have been determined to be the densest virtual groups in the virtual topology 700 based on the ratio of the traffic leaving those virtual groups (e.g., via the nodes 704 and 710 over the link(s) 718n), and the number of nodes in those virtual groups (e.g., four nodes in each virtual group). A comparison of FIG. 8 and FIG. 9 illustrates benefits resulting from the virtual grouping based on the densest virtual groups in a virtual topology. In the event that the virtual topology 700 was broken into the groups 900 and 902 due to racks in the datacenter being able to accommodate a maximum of 5 nodes, the provisioning of the VNFs in the virtual groups 900 and 902 on different racks would result in inter-rack traffic over single set of link(s) 718n that would extend between racks.

As such, at block 406, the VNF provisioning engine 304 in the management device 206/300 may determine the densest virtual groups in the VNF system included in the virtual topology received at block 402. In some embodiments, the densest virtual groups in the virtual topology may be determined based on physical group constraints such as the node constraints discussed above (e.g., the limit on the number of nodes each physical group can support). In other embodiments, the densest virtual groups in the virtual topology may be determined based on those virtual groups having a density that is greater than some threshold. While a few examples of the determination of virtual groups from a virtual topology based on density have been described, one of skill in the art in possession of the present disclosure will recognize that modifications to the virtual group density determinations discussed above will fall within the scope of the present disclosure.

Figure 10:
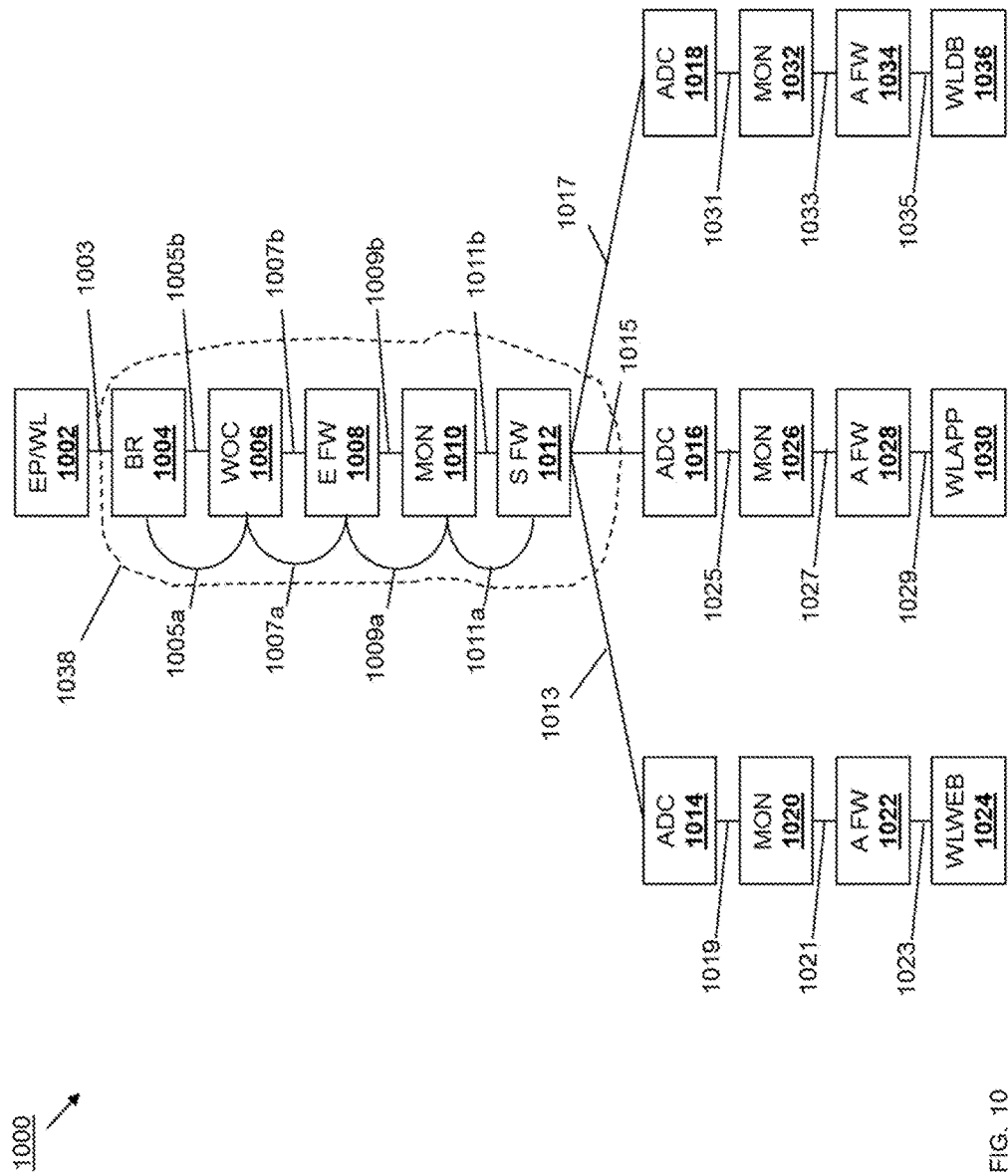
FIG. 10 is a schematic view illustrating an embodiment of a virtual topology that includes a virtualized network function system.

For example, FIG. 10 illustrates a relatively more complex virtual topology 1000 that includes an endpoint VM (EP/WL) 1002 that is coupled to a web server/endpoint VM (WLWEB) 1024, an application server/endpoint VM 1030, and a database server/endpoint VM 1036 by a VNF system. That VNF system includes a border router VNF (BR) 1004 coupled to the EP/WL 1002 by a link 1003, a Wide Area Network (WAN) Optimization Controller VNF (WOC) 1006 coupled to the BR 1004 by links 1005a and 1005b, an edge firewall VNF (E FW) 1008 coupled to the WOC 1006 by links 1007a and 1007b, a Minimum Operational Network VNF (MON) 1010 coupled to the E FW 1008 by links 1009a and 1009b, and a SEG firewall VNF (S FW) 1012 coupled to the MON 1010 by links 1011a and 1011b. Furthermore, the S FW 1012 is coupled to Application Delivery Controller VNFs (ADCs) 1014, 1016, and 1018 by respective links 1013, 1015, and 1017. Further still, the ADC 1014 is coupled to a Minimum Operational Network VNF (MON) 1020 by a link 1019, which is coupled to an Application firewall VNF (A FW) 1022 by a link 1021, which is coupled to the web server/endpoint VM (WLWEB) 1024 by a link 1023. Further still, the ADC 1016 is coupled to a Minimum Operational Network VNF (MON) 1026 by a link 1025, which is coupled to an Application firewall VNF (A FW) 1028 by a link 1027, which is coupled to the application server/endpoint VNF (WLAPP) 1030 by a link 1029. Further still, the ADC 1018 is coupled to a Minimum Operational Network VNF (MON) 1032 by a link 1031, which is coupled to an Application firewall VNF (A FW) 1034 by a link 1033, which is coupled to a database server/endpoint VM (WLDB) 1036 by a link 1035.

In an embodiment, the determination of the virtual groups from a virtual topology at block 406 may include merging VNFs in the virtual topology, which may operate to change the densest virtual groups in the virtual topology. For example, with reference to FIG. 10, the densest virtual group 1038 of VNFs in the virtual topology 1000 includes the BF 1004, the WOC 1006, the E FW 1008, the MON 1010, and the S FW 1012. However, the VNF provisioning engine 304 in the management device 206/300 may operate to merge VNFs in the virtual topology 1000 that provide the same function by determining that two or more VNFs in the virtual topology 1000 of FIG. 10 provide that same function and, in response, combining those VNFs to provide a merged virtual topology 1100 illustrated in FIG. 11. In the illustrated embodiment, the merged virtual topology 1100 includes the EP/WL 1002, BR 1004, WOC 1006, E FW 1008, S FW 1012, WLWEB 1024, WLAPP 1030, and WLDB 1036 coupled together by at least some of the links discussed above for the virtual topology 1000. However, the MON 1010, MON 1020, MON 1026, and the MON 1032 in the virtual topology 1000 have been merged and are provided in the merged virtual topology 1100 by a MON 1102 that is coupled to the E FW 1008 by links 1009a and 1009b, and to the S FW 1012 by the links 1011a and 1011b. Furthermore, the ADC 1014, ADC 1016, and the ADC 1018 in the virtual topology 1000 have been merged and are provided in the merged virtual topology 1100 by a ADC 1104 that is coupled to the MON 1102 by links 1009a and 1009b, and to the S FW 1012 by the links 1105. Further still, the A FW 1022, A FW 1028, and A FW 1034 in the virtual topology 1000 have been merged and are provided in the merged virtual topology 1100 by an A FW 1106 that is coupled to the MON 1102 by links 1107. In addition, the A FW 1106 is coupled to the WLWEB 1024 by a link 1109, to the WLAPP 1030 by a link 1111, and to the WLDB 1036 by a link 1113. As can be seen, with reference to FIG. 11, the densest virtual group 1108 in the virtual topology 1100 includes the S FW 1012, the MON 1102, the ADC 1104, and the A FW 1106.

Figure 11:
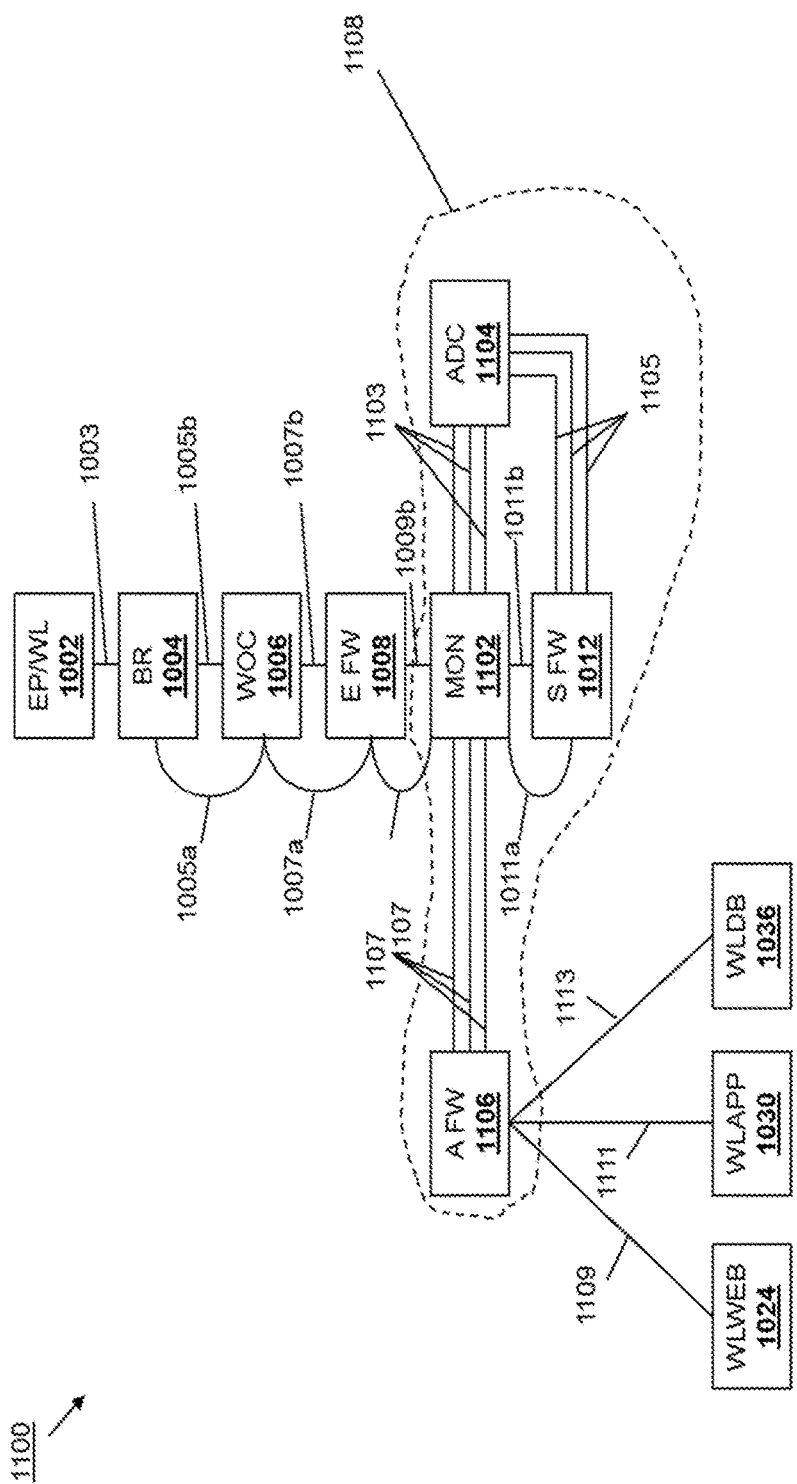
FIG. 11 is a schematic view illustrating an embodiment of the virtual topology that includes the virtualized network function system of FIG. 10 that has had virtualized network functions merged according to the teachings of the present disclosure.

Similarly to the manner illustrated in FIGS. 10 and 11 and described above, different virtual topologies that include different VNF systems may have their VNFs merged. For example a VNF system (e.g., the S FW 1012, the MON 1102, the ADC 1104, and the A FW 1106 in the densest virtual group 1108 in FIG. 11) may be shared with endpoint VMs in different virtual topology (e.g., web server VMs, application server VMs, database VNFs, other endpoint VMs, etc.) rather than recreating that VNF system for those different virtual topologies. As such, a first VNF system (e.g., the S FW 1012, the MON 1102, the ADC 1104, and the A FW 1106 in the densest virtual group 1108 in FIG. 11) may be provided in a physical group of the physical topology as discussed below, and endpoint VMs in another virtual topology that require a second VNF system that performs the same function as the first VNF system may be linked with the first VNF system to enable their network communications (i.e., rather than provisioning the second VNF system in a physical group of the physical topology of computing devices). In some embodiments, it may be desirable to share VNF systems with any many web server VMs, application server VMs, database VMs, and/or other endpoint VMs, while considering server device capacity constraints, in order to provide a more efficient provisioning of the VNFs in the datacenter(s). Furthermore, the provision of VNF systems in the datacenter may be performed with a preference for provisioning in the same server device in order to prevent between-server traffic flows via operation that VNF system. When the VNF system cannot be provisioned in the same server device, provisioning of the VNF system in the datacenter may be performed with a preference for provisioning that VNF system in server devices in the same rack as long as the inter-server device bandwidth in that rack is available to allow the communications between the VNFs in that VNF system. As such, multiple virtual groups of VNFs that perform the same function can be merged into a single VNF group even when the endpoint VMs that utilize the functions of that VNF group differ, which operates to reduce the total number of VNFs deployed in the datacenter (but may require the migration of VNF states for the VNFs).

Figure 12:
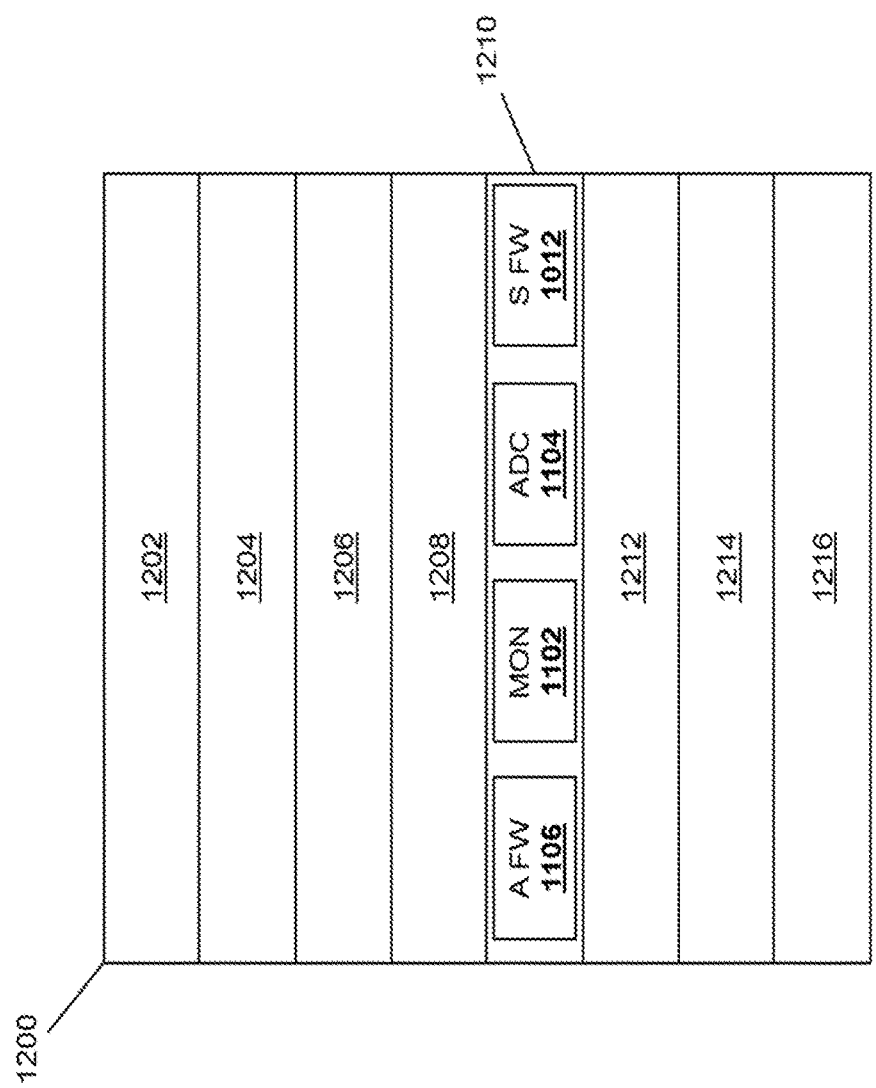
FIG. 12 is a schematic view illustrating an embodiment of a dense virtual group of the virtualized network function system of FIG. 11 provided on a server in a datacenter.

The method 400 then proceeds to block 408 where the management device provides the virtual groups of VNFs on physical groups of computing devices. In an embodiment, at block 408 the VNF provisioning engine 304 in the management device 206/300 provides virtual groups of VNFs in the virtual topology in one or more of the server devices in the datacenter 202. For example, with reference to FIG. 12, a rack 1200 is illustrated that may be any of the racks in the datacenter 202 of FIG. 2, and includes server devices 1202, 1204, 1206, 1208, 1210, 1212, 1214, and 1216 that may be any of the server devices in the datacenter of FIG. 2. At block 404, the VNF provisioning engine 304 in the management device 206/300 may have determined at least one physical group, from the physical topology of computing devices, that is provided by the server device 1210, and at block 408 the VNF provisioning engine 304 in the management device 206/300 may provide a virtual group of VNFs (e.g., the S FW 1012, MON 1102, ADC 1104, and A FW 1106 in the densest virtual group 1108 in the merged virtual topology 1100 of FIG. 11) in the server device 1210. While only one virtual group of VNFs in the virtual topology is illustrated as being provided in the physical group of computing device(s), one of skill in the art in possession of the present disclosure will recognize that other virtual groups of VNFs determined at block 406, and/or endpoint VMs in the virtual topology, may be provisioned in a similar manner.

Figure 13:
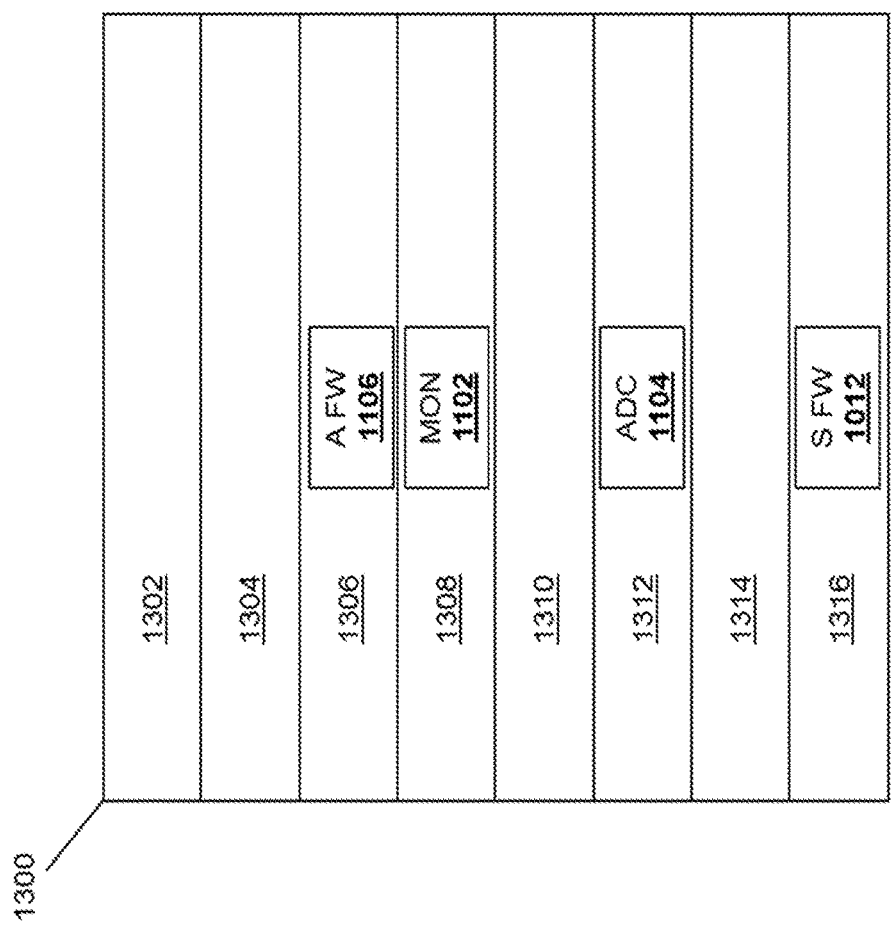
FIG. 13 is a schematic view illustrating an embodiment of a dense virtual group of the virtualized network function system of FIG. 11 provided in different server device in the same rack of a datacenter.

In another example, with reference to FIG. 13, a rack 1300 is illustrated that may be any of the racks in the datacenter 202 of FIG. 2 and includes server devices 1302, 1304, 1306, 1308, 1310, 1312, 1314, and 1316 that may be any of the server devices in the datacenter of FIG. 2. At block 404, the VNF provisioning engine 304 in the management device 206/300 may have determined at least one physical group, from the physical topology of computing devices, that is provided by the server devices 1302-1316 in the rack 1300, and at block 408 the VNF provisioning engine 304 in the management device 206/300 may provide the virtual group of VNFs (e.g., the S FW 1012, MON 1102, ADC 1104, and A FW 1106 in the densest virtual group 1108 in the merged virtual topology 1100 of FIG. 11) in the server devices 1306, 1308, 1312, and 1316. While only one virtual group of VNFs from the virtual topology is illustrated as being provided in the physical group of computing device(s), one of skill in the art in possession of the present disclosure will recognize that other virtual groups of VNFs determined at block 406, and/or endpoint VMs in the virtual topology, may be provisioned in a similar manner.

An embodiment of a VNF provisioning algorithm for determining densest virtual groups and provisioning those densest virtual groups in the densest physical groups of a physical topology is provided below:

Data: physical topology G=(V, E)
   Virtual topology H=(V', E')
   Weight functions w: E→$Q^+$, w': E'→$Q^+$
   Capacities for each v∈V
   Demands for each u∈V'
   Network bandwidth constraints for each pair in V×V
Result: An allocation function f: V'→V
Algorithm:
While H≠Ø do
  $H_1$=H;
  for i=1 to |V'|−1 do
    Let v be the least degree vertex in $H_i$;
    $H_{i+1}$=$H_i$\{v};
  end
  S=set of racks in G;
  Let C' be the densest virtual group in the collection {$H_1$, $H_2$, . . . , $H_{|V'|}$} that can fit in to any one rack in S
  $S_1$=set of virtual groups in G which have at least one neighbor in C' placed in them
  Do a best fit with C' in $S_1$ if possible, else in S;
  Define $f_{V'(C')}$: V'(C')→V from this placement
  H =H\C';
  Update capacities of V(C) and the network bandwidth capacities;
  Find a thin edge involving more than one VNF groups $V_1$, $V_2$, . . . , $V_n$ (in sequence);
  Check for supersets $S_1$, $S_2$, . . . , $S_n$ of these VFN groups that are already placed;
  Let e be an edge across the n clusters $S_1$, $S_2$, . . . , $S_n$;
  if w'(e)<network bandwidth across the n virtual groups then
    Place in it in the same racks as $S_1$, $S_2$, . . . , $S_n$, checking the capacity constraints;
    Add a thin edge between $S_1$, $S_2$, . . . , $S_n$;
    Remove the placed nodes from H;
  end
end
Return f;

The method 400 then proceeds to block 410 where the management device determines VNF(s) that are no longer operating and updates the physical topology and virtual topology. In an embodiment, the VNF provisioning engine 304 in the management device 206/300 may periodically determine (e.g., at regular intervals) whether VNFs have gone out of existence or otherwise ceased operating and, in response, update the virtual groups, virtual topologies, physical groups, and/or physical topologies. For example, endpoint VMs (e.g., the web server VMs, application server VMs, and database server VMs discussed above with reference to FIGS. 10 and 11) may "die off" or otherwise cease operating when they are finished performing the function for which they were provisioned, and as a result, the VNF systems (e.g., the S FW 1012, the MON 1102, the ADC 1104, and the A FW 1106 in the densest virtual group 1108 in FIG. 11) may free up for use by other endpoint VMs (which may be provisioned by the VNF provisioning engine 304 in the management device 206/300 as discussed above). Similarly, such VNF systems may be consolidated with other, similar function VNF systems as discussed above (e.g., when their associated endpoint VMs cease operating and server device capacity constraints now allow the merging operations discussed above). In response to the removal or merging of VNFs in the computing devices, VNF provisioning engine 304 in the management device 206/300 may update the associated virtual topologies and the physical topologies, and such updates may result in provisioning, merging, and/or otherwise repositioning the VNFs in the computing devices to optimize resources.

An embodiment of a VNF merging/removal algorithm for dealing with no-longer-operating VNFs or VMs is provided below:

Data: physical topology G=(V, E)
    Virtual topology H =(V', E'); H involves placed and unplaced VNFs
    Weight functions w: E→Q$^+$, w': E'→Q$^+$
    Capacities for each v∈V
    Demands for each u∈V'
    Result: An allocation function f: V'→V
Algorithm:
for every period t do
    Remove VMs/VNFs that have gone out of existence or use;
    Update physical topology G and its capacities;
    Update virtual topology H and the demands;
end
Run VNF provisioning algorithm on updated physical topology G and virtual topology H Thus, systems and methods have been described that provision VNFs in a VNF system by determining both the densest physical groups in a physical topology of computing devices and the densest virtual groups in a virtual topology that includes the VNF system via respective ratios of the traffic leaving those groups and the number of nodes in those groups. It has been found that such density determinations provide virtual groups that may be provisioned on the physical groups in a more efficient manner than is possible with conventional VNF provisioning systems. Furthermore, the merging of VNFs and/or virtual groups within and across VNF systems provides for further efficiencies in the provisioning of the VNFs.

While the systems and methods for VNF provisioning have been discussed above as provisioning the VNFs in a virtual group on the same server device (or server devices in the same rack) in order to provide datacenter bandwidth and power efficiencies, the systems and methods of the present disclosure may have benefits in datacenters where those issues are not a consideration or priority. For example, datacenter bandwidth and power capability may not be a concern in some situations, and rather the provisioning of VNFs may be performed to, for example, minimize the chance of failure of all the VNFs in a virtual group in the event of a failure of the server device(s) in the physical group on which they were provided. For example, the densest virtual groups of VNFs may be determined as discussed above, and then the VNFs in those densest virtual groups may be purposely separated and provided on different physical groups in the physical topology of the computing devices (e.g., on different server devices, in different racks, in different datacenters, etc.) using techniques such as, for example, round robin placement of the VNFs in the virtual group.

Furthermore, policies may be provided that drive the provisioning of virtual groups and/or VNFs in the different physical groups. For example, a plurality of datacenters may include a proprietary or private datacenter (e.g., as provided in a company or business) and a public datacenter (e.g., provided for use by customers of a datacenter provider). VNFs and/or VNF systems may then be categorized according to different levels of security required for those VNFs, and the VNFs or virtual groups to which they belong may be provisioned in the datacenters based on those security levels (e.g., relatively high security VNFs or virtual groups that include relatively high security VNFs may be provisioned in the private datacenter, while relatively low security VNFS or virtual groups that include relatively low security VNFs may be provisioned in the public datacenter). Similarly, with VNF systems or virtual groups that are provisioned across datacenters, policies may be implemented to restrict traffic flows across datacenters to those traffic flows that are below a threshold traffic level. For example, a VNF system that provides a relatively high amount of traffic between its VNFs and a relatively low amount of traffic to endpoint VMs may be provisioned entirely within a single datacenter, while allowing the endpoint VMs to be provisioned in other datacenters. If the traffic between virtual groups across datacenters is initially relatively low, and then grows over time to exceed a threshold (e.g., due to a processing change initiated by VNF configuration of a VNF in one of the virtual groups, an increase in traffic between VNF systems, the migration of a VNF system to a new datacenter, etc.), the VNFs/virtual groups may be re-provisioned as a result. Thus, while many specific examples of the VNF provisioning system have been described in detail above, one of skill in the art in possession of the present disclosure will recognize that the VNF systems discussed above may be utilized in a variety of manners that will result in benefits not explicitly described herein.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A virtualized network function (VNF) provisioning system, comprising:
    a plurality of computing device that are provided in a physical topology and that are coupled to a network; and
    a management device that is coupled to the plurality of computing device through the network, wherein the management device is configured to:
        receive virtualized network function (VNF) system information for a VNF system through the network, wherein the VNF system includes a plurality of VNFs that are provided in a virtual topology;

determine a plurality of physical groups from the physical topology, wherein each physical group identifies at least one computing device of the plurality of computing devices;

determine a plurality of virtual groups from the virtual topology based on a ratio of traffic that will leave each virtual group and a number of VNFs in each virtual group; and provide the VNFs in a first virtual group of the plurality of virtual groups on the at least one computing device in a first physical group of the plurality of physical groups.

2. The VNF provisioning system of claim 1, wherein the management device is configured to:

merge at least one of the VNFs in a second virtual group of the plurality of virtual groups with at least one of the VNFs in the first virtual group that is provided on the at least one computing device in the first physical group.

3. The VNF provisioning system of claim 2, wherein the management device is configured to:

identify the first virtual group and the second virtual group for merging based on the first virtual group and the second virtual group including the same number of VNFs, and the determination that the traffic between the first virtual group and the second virtual group is below a threshold.

4. The VNF provisioning system of claim 1, wherein the determining the plurality of virtual groups from the virtual topology includes determining the first virtual group and a second virtual group that exchange traffic via a single pair of VNFs.

5. The VNF provisioning system of claim 1, wherein the management device is configured to:

determine that a VNF in the first virtual group is no longer operating and, in response, update the plurality of physical groups and the plurality of virtual groups.

6. The VNF provisioning system of claim 1, wherein the first physical group identifies one of a single computing device of the plurality of computing devices and a subset of the plurality of computing devices that are provided in the same rack.

7. The VNF provisioning system of claim 1, wherein the ratio of traffic that will leave each virtual group and the number of VNFs in each virtual group provides a virtual group density for each of the plurality of virtual groups, and wherein the plurality of virtual groups are determined in response to having virtual group densities that are greater than a threshold.

8. An information handling system (IHS), comprising:
a communication system and that is configured to couple to a plurality of computing systems;
a processing system that is coupled to the communication system; and
a memory system that is coupled to the processing system and that includes instructions that, when executed by the processing system, cause the processing system to provide a virtualized network function (VNF) allocation engine that is configured to:
receive virtualized network function (VNF) system information for a VNF system, wherein the VNF system includes a plurality of VNFs that are provided in a virtual topology;
determine a plurality of physical groups from a physical topology of the plurality of computing devices, wherein each physical group identifies at least one computing device of the plurality of computing devices;

determine a plurality of virtual groups from the virtual topology based on a ratio of traffic that will leave each virtual group and a number of VNFs in each virtual group; and provide the VNFs in a first virtual group of the plurality of virtual groups on the at least one computing device in a first physical group of the plurality of physical groups.

9. The IHS of claim 8, wherein the VNF allocation engine is configured to:

merge at least one of the VNFs in a second virtual group of the plurality of virtual groups with at least one of the VNFs in the first virtual group that is provided on the at least one computing device in the first physical group.

10. The IHS of claim 9, wherein the VNF allocation engine is configured to:

identify the first virtual group and the second virtual group for merging based on the first virtual group and the second virtual group including the same number of VNFs, and the determination that the traffic between the first virtual group and the second virtual group is below a threshold.

11. The IHS of claim 8, wherein the determining the plurality of virtual groups from the virtual topology includes determining the first virtual group and a second virtual group that exchange traffic via a single pair of VNFs.

12. The IHS of claim 8, wherein the VNF allocation engine is configured to:

determine that a VNF in the first virtual group is no longer operating and, in response, update the plurality of physical groups and the plurality of virtual groups.

13. The IHS of claim 8, wherein the ratio of traffic that will leave each virtual group and the number of VNFs in each virtual group provides a virtual group density for each of the plurality of virtual groups, and wherein the plurality of virtual groups are determined in response to having virtual group densities that are greater than a threshold.

14. A method for provisioning virtualized network functions, comprising:

receiving, by a management device, virtualized network function (VNF) system information for a VNF system, wherein the VNF system includes a plurality of VNFs that are provided in a virtual topology;

determining, by the management device, a plurality of physical groups from a physical topology of a plurality of computing devices, wherein each physical group identifies at least one computing device of the plurality of computing devices;

determining, by the management device, a plurality of virtual groups from the virtual topology based on a ratio of traffic that will leave each virtual group and a number of VNFs in each virtual group; and providing, by the management device on the at least one computing device in a first physical group of the plurality of physical groups, the VNFs in a first virtual group of the plurality of virtual groups.

15. The method of claim 14, further comprising:

merging, by the management device, at least one of the VNFs in a second virtual group of the plurality of virtual groups with at least one of the VNFs in the first virtual group that is provided on the at least one computing device in the first physical group.

16. The method of claim 15, further comprising:
identifying, by the management device, the first virtual group and the second virtual group for merging based on the first virtual group and the second virtual group including the same number of VNFs, and the determination that the traffic between the first virtual group and the second virtual group is below a threshold.

17. The method of claim 14, wherein the determining the plurality of virtual groups from the virtual topology includes determining the first virtual group and a second virtual group that exchange traffic via a single pair of VNFs.

18. The method of claim 14, further comprising:
determining, by the management device, that a VNF in the first virtual group is no longer operating and, in response, update the plurality of physical groups and the plurality of virtual groups.

19. The method of claim 14, wherein the first physical group identifies one of a single computing device of the plurality of computing devices and a subset of the plurality of computing devices that are provided in the same rack.

20. The method of claim 14, wherein the ratio of traffic that will leave each virtual group and the number of VNFs in each virtual group provides a virtual group density for each of the plurality of virtual groups, and wherein the plurality of virtual groups are determined in response to having virtual group densities that are greater than a threshold.

* * * * *